United States Patent [19]
Sage

[11] 3,820,231
[45] June 28, 1974

[54] INERTIA WELDING METHOD FOR PIPELINES

[75] Inventor: Ira H. Sage, Peoria, Ill.

[73] Assignee: Production Technology Inc., Peoria, Ill.

[22] Filed: Aug. 2, 1973

[21] Appl. No.: 384,917

Related U.S. Application Data

[63] Continuation of Ser. No. 176,971, Sept. 1, 1971, abandoned, which is a continuation of Ser. No. 828,479, May 28, 1969, abandoned.

[52] U.S. Cl.................... 29/470.3, 156/73, 228/2
[51] Int. Cl........................................... B23k 27/00
[58] Field of Search.................. 29/234, 237, 470.3; 156/73, 580; 228/2, 6, 44; 219/60, 136, 137

[56] References Cited
UNITED STATES PATENTS

| | | | |
|---|---|---|---|
| 3,388,849 | 6/1968 | Blum et al. | 29/470.3 |
| 3,427,428 | 2/1969 | Nelson et al. | 219/60 X |
| 3,439,853 | 4/1969 | Deemie | 228/2 |
| 3,578,233 | 5/1971 | Meister et al. | 228/44 X |

Primary Examiner—J. Spencer Overholser
Assistant Examiner—Robert J. Craig
Attorney, Agent, or Firm—Phillips, Moore, Weissenberger, Lempio & Strabala

[57] ABSTRACT

A center-drive inertia welder mounted on a vehicle and comprising a rotatable chuck mounted between a fixed chuck and an axially-movable chuck and having a hydraulic system for moving a workpiece in the axially-movable chuck against the workpiece in the rotatable chuck and for moving the workpiece in the rotatable chuck against the workpiece in the fixed chuck.

3 Claims, 3 Drawing Figures

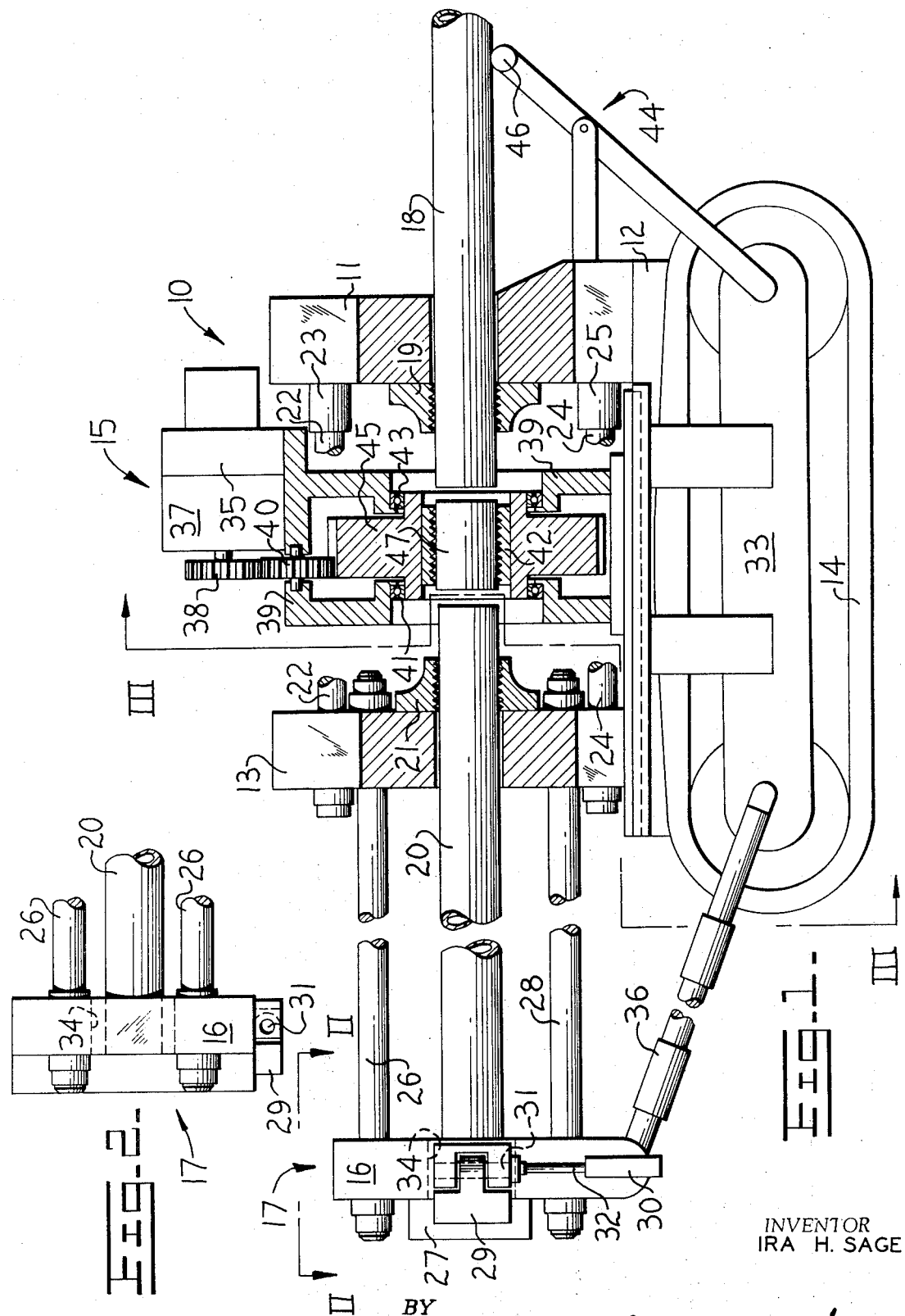

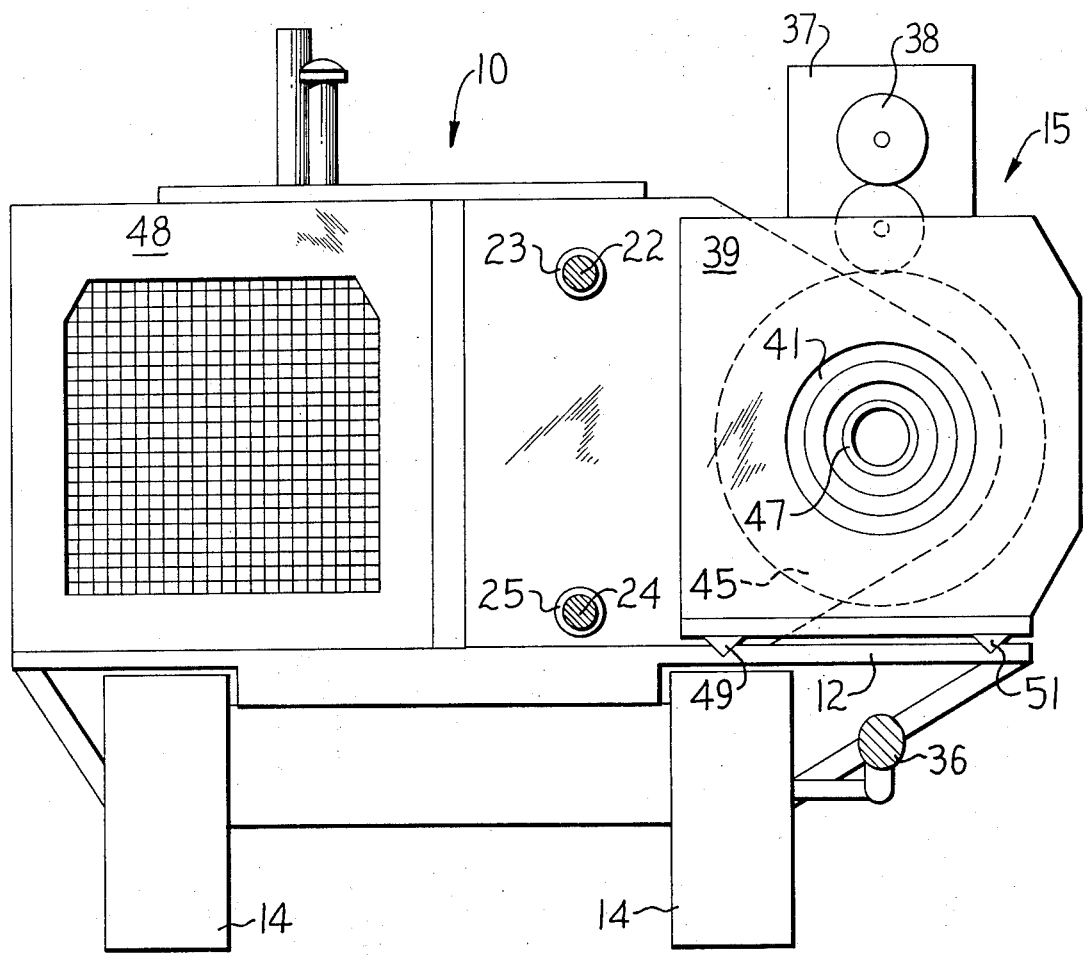

INERTIA WELDING METHOD FOR PIPELINES

CROSS-REFERENCE TO RELATED APPLICATION

This is a continuation of application Ser. No. 176,971, filed Sept. 1, 1971 which is a continuation of application Ser. No. 828,479, filed May 28, 1969 both now abandoned.

BACKGROUND AND SUMMARY OF THE INVENTION

This invention relates to an inertia welder for pipelines, and more specifically to a method and apparatus which can be used in the field at pipeline locations to join a continuous length of pipe.

There has been a need, for some time now, for a machine capable of providing a good weld on large diameter pipes at a pipeline location. The present invention discloses a movable pipe machine which provides power to operate the welding portion of the machine, as well as power to provide mobility for the machine to move along as the welds are accomplished.

The inertia welding machine of this invention generally provides an inertia welder mounted on the frame of a movable machine, such as a crawler-tractor. The machine provides the capability of joining large diameter pipes into a continuous pipeline by welding a short, rotatable pipe section between two longer, nonrotatable pipe sections. In effect, two welds are accomplished at one time.

A single power source, such as a diesel engine, offers versatility and utility by powering all the components of the welding apparatus and also being available to move the entire machine from one spot to another.

Therefore, it is an object of this invention to provide a machine for inertia welding pipelines in "on site" locations.

It is also an object of this invention to provide a machine upon which an inertia welder is mounted, the machine and the inertia welder being powered by a single power source.

It is a further object of this invention to provide such a machine in which the welder is so located that the pipe sections can be welded and then laid alongside the machine as it moves along.

It is a still further object of this invention to provide such a machine which can weld two large diameter pipes into a continuous pipeline by welding a short section between the two longer sections.

Other objects and advantages of the present invention will become apparent from the following description and claims as illustrated in the accompanying drawings which, by way of illustration, show a preferred embodiment of the present invention and principles thereof and what is now considered to be the best mode contemplated for applying these principles. It is recognized that other embodiments of the invention utilizing the same or equivalent principles may be used, and structural changes may be made as desired by those skilled in the art, without departing from the present invention and purview of the appended claims.

BRIEF DESCRIPTION OF THE DRAWINGS

FIG. 1 illustrates a side view, partially in section, of an inertia welder mounted on a movable machine, according to the present invention;

FIG. 2 illustrates the top view of a back stop which may be used with the present invention, taken along a line II—II of FIG. 1; and FIG. 3 illustrates a front view of a portion of the machine, taken along a line III—III of FIG. 1.

DETAILED DESCRIPTION OF THE INVENTION

As shown in FIG. 1, an inertia welder 10 is mounted on a base or frame 12 which, in turn, is mounted between two sets of tracks 14, similar to the tracks of a crawler-type tractor. Of course, if desired, the base could be mounted on a wheeled vehicle.

The welding portion of the machine consists mainly of a back frame member 11, a front frame member 13, a central flywheel assembly 15, and a back stop assembly 17. A pair of nonrotatable chucks, or holding means, 19 and 21 are fixed to the back frame member 11 and the front frame member 13, respectively. These chucks are used to hold pipe sections 18 and 20 against rotation during a friction or inertia welding operation.

Frames 11 and 13 are fastened together by means of tie rods 22 and 24, and frame member 13 is fastened to a frame member 16 of back stop assembly 17 by four tie rods, two of which are shown at 26 and 28.

The tie rods 22 and 24 connecting frames 11 and 13 actually consist of hydraulic piston rods extending from cylinders 23 and 25, which are fastened to frame member 11.

A similar piston-tie rod system could be utilized to cause relative motion between frame 11 and the flywheel portion 15, or any other suitable means, such as a lost-motion linkage in rod 22 and 24, could be provided so that positive control of the distance between the two portions can be maintained, for reasons which will be explained later.

The back stop assembly 17, which may be essentially the same as that described in U.S. Pat. No. 3,439,853 issued Apr. 22, 1969, and assigned to the assignee hereof, consists mainly of frame member 16 which is fastened to the frame member 13 in the manner previously described. A swinging back-up plate 27, a two-piece lock 29, a locking pin 31 which fastens the two-piece lock together, and a hydraulic cylinder 30, having a piston rod 32 which is fastened to pin 31 to lock or unlock the two-piece lock, are all mounted on frame 16.

An opening 34 in frame member 16 allows a length of pipe 20 to be passed through the frame member when the back-up plate 27 is swung open. If desired, a collapsible support 36 can be fastened to the bottom of the assembly 17 and also the track frame 33 in order to support assembly 17 when it is extended a large distance beyond the end of the machine. Whether or not back stop 17 would need to be supported by a support 36 would depend upon the amount of over-hang created by the length of pipe 20 to be welded.

Referring to the flywheel assembly 15, a motor means 35 and a gear box 37 are mounted on a support housing 39 which is fastened to the frame 12. A pair of bearing assemblies 41 and 43 rotatably carry a flywheel 45 which is rotated by the motor and gear box through gears 38 and 40. A chuck or holding means 42 is fixed in an inner diameter of the flywheel 45 and is used to hold a short section of pipe 47.

Flywheel assembly 15 and front frame member 13 are slidably mounted on the base 12, in a manner to be described. This allows frame member 13 and flywheel assembly 15 to be moved toward the back frame member 11 when it is desired to weld the work pieces.

Pipe section 20 represents a standard length of pipe which is to be welded to an unlimited length of pipe 18. The two pipe sections are welded together by means of the short pipe section 47, which is welded between them. When the welding takes place, two welds are actually made at the same time -- that is, pipe section 20 is welded to the front part of pipe member 47 and the pipe section 18 is welded to the back end of pipe section 47.

A support assembly 44 may also be fastened to the track frame member 33, and also to back frame member 11, to support the long section 18. A roller 46 may be carried on the end of the support assembly so that as the machine moves from one spot to another, the welded section 18 can travel longitudinally on the roller.

As shown in FIG. 3, the welding portion of the machine may be situated to one side of the frame 12 and a main power source 48 may be situated on the opposite side thereof. Power source 48, which may be a diesel engine, can be used to provide power to the welding portion of the machine as well as to provide power to the tracks 14 so as to move the machine from place to place. The location of the welding mechanism to one side of the machine allows the pipe sections to be welded and then laid alongside the machine as it moves along.

A pair of V-block ways 49 and 51 allows the flywheel assembly 15 to slide relative to the frame 12. Thus the assembly 15 can move forward and backward when pressure is applied thereto. The front frame member 13 may also be mounted on ways 49 and 51, or means similar thereto, so that it can move forward and backward upon application of pressure in hydraulic cylinders 23 and 25.

In general, it is preferred that flywheel assembly 15 move toward back frame member 11 due to contact between pipe sections 20 and pipe section 47.

A typical operation of the device would be as follows: The end of a long length of pipe 18 is fastened within chuck 19 and supported by the assembly 44. A short piece of pipe 47 is next inserted and clamped in the chuck 42 of the flywheel assembly 15. Then, a standard length of pipe 20 is inserted through hole 34 of back stop assembly 17 and through chuck 21.

The swinging back-up plate 27 is then swung closed at the end of the pipe 20 and the pin 31 is actuated by hydraulic cylinder 30 to lock the two-piece clamp 29 in place. Pipe section 20 is moved back against the back-up plate 27 and chuck 21 is secured to the pipe.

Flywheel 45 is then driven by the power source 48 which provides power to motor 35, gear box 37, and gears 38 and 40. As the flywheel rotates, pipe section 47 rotates with it since it is clamped within the flywheel. When the predetermined velocity is reached by the flywheel, a clutch or other conventional disconnect (not shown) inside gear box 37 is activated to disconnect the motor means from the flywheel. At this point hydraulic cylinders 23 and 25 are activated, causing cylinder rods 22 and 24 to pull frame member 13 toward frame member 11. Pipe section 20, clamped within the chuck 21, moves with frame member 13 and comes into contact with the short pipe section 47.

Since the entire flywheel assembly is able to move on the ways 49 and 51, the pressure applied by pipe section 20 on pipe section 47 causes it to move towards the back frame member 11.

Short pipe section 47 then comes into contact with pipe member 18 and a weld is accomplished between the short pipe section 47 and the long sections 18 and 20.

When the weld is completed, chucks 19, 21 and 42 are released and the hydraulic pressure is applied to the back sides of the cylinder 23 and 25 to cause the rods 22 and 24 to be extended. This causes front member 13 to be moved back to its original position by the force of the tie bars 22 and 24. The flywheel portion 15 may also be moved back to its original position by any suitable means provided (not shown), such as those discussed previously.

The power source 48 then provides power to the tracks 14 so as to move the entire machine forward. When the machine reaches the position such that pipe 20 reaches the position in which pipe section 18 is illustrated, the machine is stopped and the cycle is repeated.

Since it is extremely difficult to machine away the internal flash after welding, each end of the short pipe section 47 might be machined with a flash trap, if desired. The flash trap, which could be similar to that disclosed in U.S. Pat. No. 3,452,914, issued July 1, 1969, and assigned to the assignee hereof, would act to contain the flash and to prevent it from reaching the inside of the pipe where it is to cause trouble.

In many cases, the external flash can be left on the welded pipe section. However, if for some reason it should be desirable to move the external flash, a flash shear of a well-known type could be built into the machine for this purpose.

The Applicant has thus provided an improved inertia welding machine capable of being operated in the field to produce good, quick, and economical welds on pipelines. Although the invention has been described and illustrated relative to a single embodiment thereof, it is capable of wide variation and modification, as will be obvious to those skilled in the art, without exceeding the purview of the following claims.

What is claimed is:

1. A method of welding lengths of pipe into a pipeline in situ, said method comprising the steps of providing a vehicle-mounted inertia welder having first and second frames mounted on a base, a flywheel assembly mounted for free axial movement on the base between the frames, pipe-holding means mounted respectively on each frame and on the flywheel assembly, and a backstop means carried by said second frame for supporting a free length of pipe and applying axial force to the said free pipe length end portion, disposing said vehicle mounted welder in a stationary position adjacent to a terminal length of said pipeline, holding said terminal length of said pipeline to be welded against rotational movement in the pipe holding means mounted on a first one of said frames, fixedly holding an intermediate section of pipe adjacent the end of said terminal length of pipeline in said pipe holding means mounted on the flywheel assembly, 2. The method of claim 1 including the additional step of releasing hold on said free, intermediate, and terminal lengths of pipe.

holding one end of a free length of pipe against rotation and adjacent the end of said intermediate length of pipe in the pipe holding means mounted on said second one of said frames whereby said intermediate section of pipe is located intermediate said pipeline and said free length of pipe and the other end of said free length of pipe is supported by said backstop means, holding said first one of said frames against axial movement relative to said vehicle, permitting free axial movement of said flywheel assembly and revolving same to rotate said intermediate section with respect to said pipeline and said free length of pipe until a predetermined velocity is attained, moving said second frame and said backstop means toward said first frame and sequentially forcing said free length against said intermediate section, and said intermediate section against said pipeline to provide frictional engagement at their common interfaces at a predetermined, axially applied pressure by means of a force applied to said free length of pipe through said second one of said frames and said backstop means, thereby friction welding said pipeline, said intermediate section, and said free length of pipe to form an extension of said pipeline.

3. The method of claim 2 further including the step of advancing said vehicle along the extension of said pipeline.

* * * * *

UNITED STATES PATENT OFFICE
CERTIFICATE OF CORRECTION

Patent No. 3,820,231          Dated June 28, 1974

Inventor(s) Ira H. Sage

It is certified that error appears in the above-identified patent and that said Letters Patent are hereby corrected as shown below:

Column 5, lines 1-3 beginning with "2." and ending with "pipes" should be deleted and inserted in column 6 after line 13 as follows:

--2. The method of claim 1 including the additional step of releasing hold on said free, intermediate, and terminal lengths of pipe.--

Signed and sealed this 8th day of October 1974.

(SEAL)
Attest:

McCOY M. GIBSON JR.                C. MARSHALL DANN
Attesting Officer                  Commissioner of Patents